(12) United States Patent
Hamamoto et al.

(10) Patent No.: US 8,931,445 B2
(45) Date of Patent: Jan. 13, 2015

(54) INTERNAL COMBUSTION ENGINE

(75) Inventors: Takayuki Hamamoto, Yokohama (JP); Kensuke Tominaga, Isehara (JP); Youko Yoshioka, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 13 days.

(21) Appl. No.: 13/982,008

(22) PCT Filed: Jan. 30, 2012

(86) PCT No.: PCT/JP2012/052015
§ 371 (c)(1), (2), (4) Date: Jul. 26, 2013

(87) PCT Pub. No.: WO2012/105509
PCT Pub. Date: Aug. 9, 2012

(65) Prior Publication Data
US 2013/0306012 A1    Nov. 21, 2013

(30) Foreign Application Priority Data

Jan. 31, 2011 (JP) .................................. 2011-017807

(51) Int. Cl.
*F01L 1/34*     (2006.01)
*F02D 13/02*    (2006.01)

(52) U.S. Cl.
CPC ............... *F01L 1/34* (2013.01); *F02D 13/0238* (2013.01); *F02D 13/023* (2013.01); *Y02T 10/18* (2013.01)
USPC .................................................... 123/90.16

(58) Field of Classification Search
USPC .................. 123/90.11, 90.15, 90.16
See application file for complete search history.

(56) References Cited

U.S. PATENT DOCUMENTS

| 8,006,658 | B2 * | 8/2011 | Nakamura et al. | 123/90.16 |
|---|---|---|---|---|
| 8,061,311 | B2 * | 11/2011 | Nakamura | 123/90.16 |
| 8,082,895 | B2 * | 12/2011 | Yamada et al. | 123/90.16 |
| 8,181,613 | B2 * | 5/2012 | Arinaga et al. | 123/90.16 |
| 8,291,875 | B2 * | 10/2012 | Yang et al. | 123/90.16 |
| 8,667,936 | B2 * | 3/2014 | Kajiura et al. | 123/90.16 |
| 2012/0132163 | A1 * | 5/2012 | Shoji et al. | 123/90.16 |

FOREIGN PATENT DOCUMENTS

| JP | 2008-95668 A | 4/2008 |
|---|---|---|
| JP | 2009-24560 A | 2/2009 |
| JP | 2009-228640 A | 10/2009 |

* cited by examiner

*Primary Examiner* — Thomas Denion
*Assistant Examiner* — Daniel Bernstein
(74) *Attorney, Agent, or Firm* — Foley & Lardner LLP

(57) ABSTRACT

Provided is an internal combustion engine including two intake valves for each cylinder, the internal combustion engine including: a fixed cam for driving one of the two intake valves with a lift characteristic having a valve opening timing close to a top dead center; a variable valve actuation mechanism capable of changing, in accordance with an engine running condition, lift characteristics between a low-lift characteristic having an event angle and a lift amount each being smaller than an event angle and a lift amount of the fixed cam, and a high-lift characteristic having the event angle and the lift amount each being larger than the event angle and the lift amount of the fixed cam; and a variable cam for driving another of the two intake valves, the variable cam including the variable valve actuation mechanism, in which the variable valve actuation mechanism is configured to set the lift characteristic of the variable cam so as to obtain a valve opening timing on a retard side relative to the valve opening timing of the fixed cam in a case of the low-lift characteristic.

15 Claims, 6 Drawing Sheets

INTERNAL COMBUSTION ENGINE

TECHNICAL FIELD

This invention relates to an internal combustion engine including a variable valve actuation mechanism.

BACKGROUND ART

There is known a technology for improving combustion efficiency, etc. of an internal combustion engine through use of a variable valve actuation system, which variably controls a valve timing, an event angle, and a lift amount of intake and exhaust valves in accordance with a running condition.

For example, JP 2008-95668A discloses a variable valve actuation system capable of variably controlling, in a so-called dual-intake valve internal combustion engine including two intake valves for each cylinder, a valve timing and the like of one intake valve while maintaining a fixed valve timing and the like of the other intake valve. More specifically, an opening timing of the intake valve on the fixed side is set to a top dead center and a closing timing thereof is set to a bottom dead center, whereas an opening timing of the intake valve on the variable side is fixed to the top dead center and a closing timing thereof is variably controlled. In other words, the opening timings of both the intake valves are fixed to the top dead center, and only the closing timing of the intake valve on the variable side is changed.

SUMMARY OF INVENTION

By the way, the configuration of JP 2008-95668A employs single valve variable control, in which only one of the intake valves is variably controlled in a low-load range. The single valve variable control is performed for the purpose of enhancing a flow inside the cylinder by varying the amounts of intake air flowing into the cylinder through the two intake valves using the difference in lift amount between the respective valves.

However, even in the single valve variable control, the opening timings of both the intake valves are the same at the top dead center, and the flow inside the cylinder is to be enhanced by only the difference in lift amount. Therefore, the effect of enhancing the flow inside the cylinder is small when the intake amount is small. Thus, in the low-load range, the flow inside the cylinder is desired to be enhanced, but due to the low load, the intake amount is small, and hence the flow inside the cylinder cannot be enhanced sufficiently. Consequently, there is a problem in that combustion stability cannot be ensured.

Therefore, this invention has an object to provide an internal combustion engine capable of enhancing the flow inside the cylinder even in the low-load range.

A detailed description of this invention as well as other features and advantages thereof is given in the following description of the specification, and is also illustrated in the accompanying drawings.

DESCRIPTION OF EMBODIMENTS

First Embodiment

Figure 1:
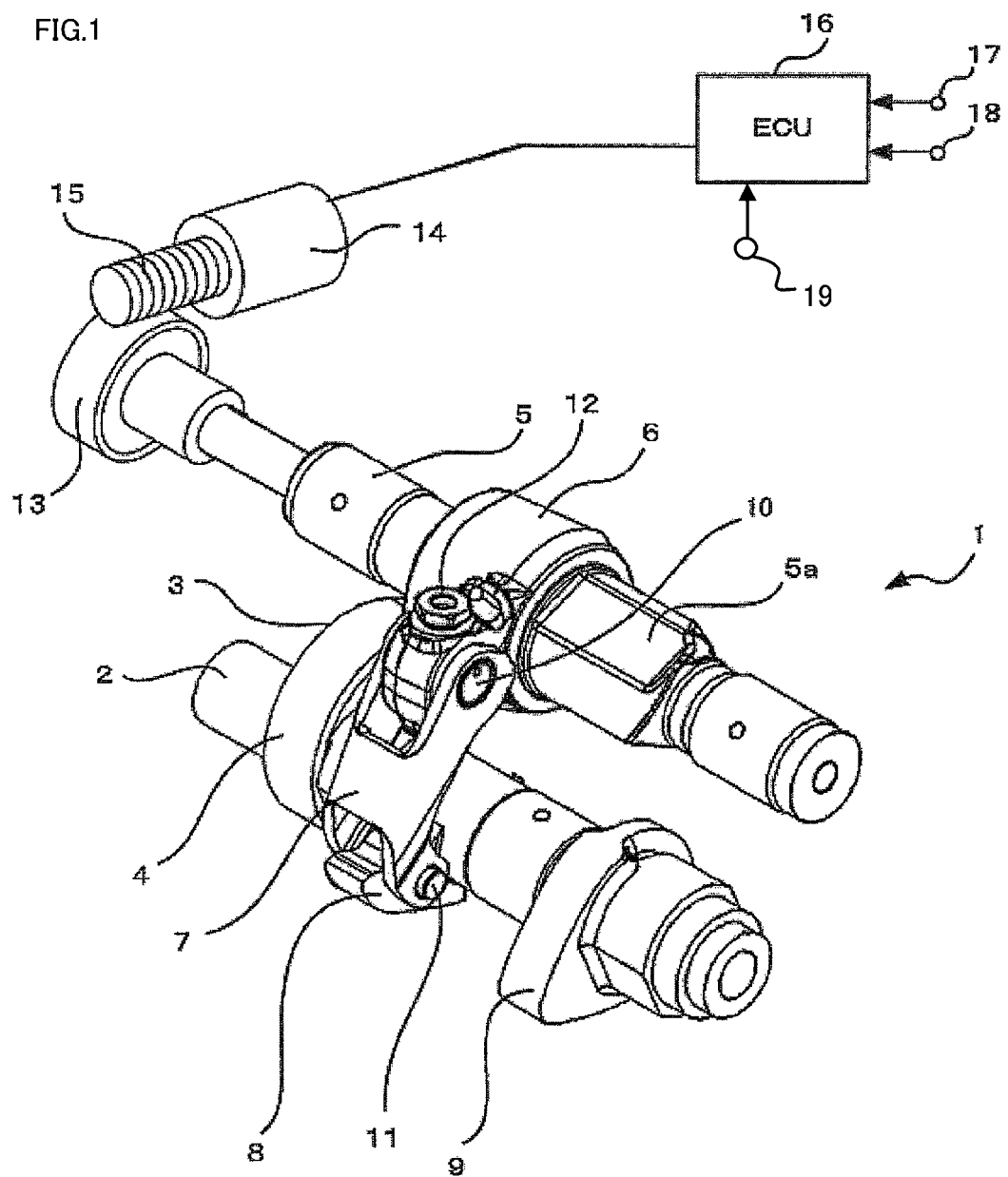
FIG. 1 is a configuration diagram of a variable valve actuation mechanism to which this invention is applied.

FIG. 1 is a configuration diagram of a variable event angle mechanism 1 to be used in this embodiment.

The variable event angle mechanism 1 is mounted to a dual-intake valve internal combustion engine including two intake valves for each cylinder, and is configured to drive one intake valve to be opened and closed by a rocker cam 8 and to drive the other intake valve to be opened and closed by a rotary cam 9. It should be noted that the description is given on the assumption of a naturally aspirated engine as a specific example.

A valve driving principle of the rocker cam 8 is similar to that of a variable event angle mechanism disclosed in, for example, JP 2003-201868 A, and hence only an overview thereof is described herein.

A drive shaft 2 and a control shaft 5 are arranged substantially in parallel to a cylinder array of the internal combustion engine. The drive shaft 2 rotates in synchronization with a crankshaft of the internal combustion engine through an intermediation of a timing chain or the like.

An eccentric cam 3 is fixed to an outer periphery of the drive shaft 2 by press-fitting or the like, and a first link 4 is fitted onto an outer periphery of the eccentric cam 3 so as to be rotatable relative to the eccentric cam 3.

Further, a gear 13 is fixed in the vicinity of one end portion of the control shaft 5 by press-fitting or the like, and the gear 13 meshes with a pinion gear 15 of an actuator 14. In other words, the control shaft 5 can be rotated by driving the actuator 14. The actuator 14 is controlled by an engine control unit (ECU) 16 based on an engine speed detected by a crank angle sensor 17, an engine load detected by an accelerator opening degree sensor 18, and the like. Details of the control are described later.

The control shaft 5 includes an eccentric cam portion 5a, which is formed of an outer peripheral portion thereof into a shape of an eccentric cam, and a rocker arm 6 is fitted onto the eccentric cam portion 5a so as to be rotatable relative to the control shaft 5.

One end of the first link 4 is coupled to one end of the rocker arm 6 through an intermediation of a coupling pin or the like so that the first link 4 is rotatable relative to the rocker arm 6. One end of a second link 7 is coupled to the other end of the rocker arm 6 through an intermediation of a coupling pin 10 so that the second link 7 is rotatable relative to the rocker arm 6. The other end of the second link 7 is coupled to the rocker cam 8 through an intermediation of a coupling pin 11 so that the second link 7 is rotatable relative to the rocker cam 8. The rocker cam 8 is fitted onto the outer periphery of the drive shaft 2 so that the rocker cam 8 is rotatable relative to the drive shaft 2.

The rotary cam 9 is fixed to the outer periphery of the drive shaft 2 by press-fitting or the like.

It should be noted that the coupling pin 10 is positioned in a pin hole of the rocker arm 6 by a lock bolt 12 and an adjuster screw (not shown) arranged at a position opposed to the lock bolt 12 across the coupling pin 10. When the position of the coupling pin 10 changes, the position of the second link 7 changes as well, and the posture of the rocker cam 8 changes along with the change in position of the second link 7. Therefore, in adaptation to be performed when mounting the variable event angle mechanism 1 to the internal combustion engine, the posture of the rocker cam 8 is adjusted by the adjuster screw and the like.

With the configuration as described above, when the drive shaft 2 rotates, the first link 4 translates through an intermediation of the eccentric cam 3. In response to the translation of the first link 4, the rocker arm 6 rocks about a shaft center of the eccentric cam portion of the control shaft 5, and the rocker cam 8 rocks about the drive shaft 2 through an intermediation of the second link 7. Accordingly, the rocker cam 8 opens and closes one intake valve through an intermediation of a valve lifter or the like in association with rotation of the internal combustion engine.

Further, through control of the rotation of the control shaft 5 by the actuator 14, the position of the shaft center of the eccentric cam portion 5*a* serving as a rocking center of the rocker arm 6 is changed so that a lift characteristic of the intake valve can be changed continuously. For example, when the shaft center of the eccentric cam portion 5*a* becomes close to the shaft center of the drive shaft 2, the event angle is increased, and the lift amount is also increased along with the increase in event angle. When the event angle and the lift amount change, a central position (central angle) of the event angle does not move, but the degrees of the angle ranging from the central angle to the valve opening timing and the valve closing timing change. An amount of variation of the event angle of the rocker cam 8, the valve timing, and the like are described later.

Further, when the drive shaft 2 rotates, the rotary cam 9 fixed to the drive shaft 2 rotates as well, and similarly to a general internal combustion engine, the rotary cam 9 opens and closes the other intake valve. In other words, the rotary cam 9 does not include a variable mechanism, and the event angle and the like are fixed.

As described above, the variable event angle mechanism 1 is configured to variably control the valve lift amount and the event angle for only one intake valve of the dual-intake valve internal combustion engine. The variable event angle mechanism 1 is configured to variably control only one of the two intake valves, and hence, as compared to the configuration in which two intake valves are variably controlled, a valve reaction force applied to the rocker arm 6, the second link, and the like is halved. Therefore, required strength of the rocker arm 6 and the like is reduced, and required output of the actuator 14 is reduced. As a result, the components can be reduced in size and weight.

Further, when fluctuation of the valve lift amount is present due to a manufacturing tolerance or the like, the effect of the fluctuation becomes significant particularly at the time of low valve lift, and hence adjustment is necessary at the time of manufacturing. However, in the configuration in which the lift amount of one intake valve is fixed and the other intake valve is variably controlled alone, the effect of the fluctuation is suppressed as compared to the configuration in which two intake valves are variably controlled. Therefore, the adjustment is facilitated.

It should be noted that the variable event angle mechanism 1 of FIG. 1 is described only as an example, and may be another different mechanism as long as the mechanism is capable of variably controlling the event angle for only one intake valve.

Next, the valve lift amount and the event angle (lift characteristics) controlled by the variable event angle mechanism 1 are described with reference to FIG. 2.

Figure 2:
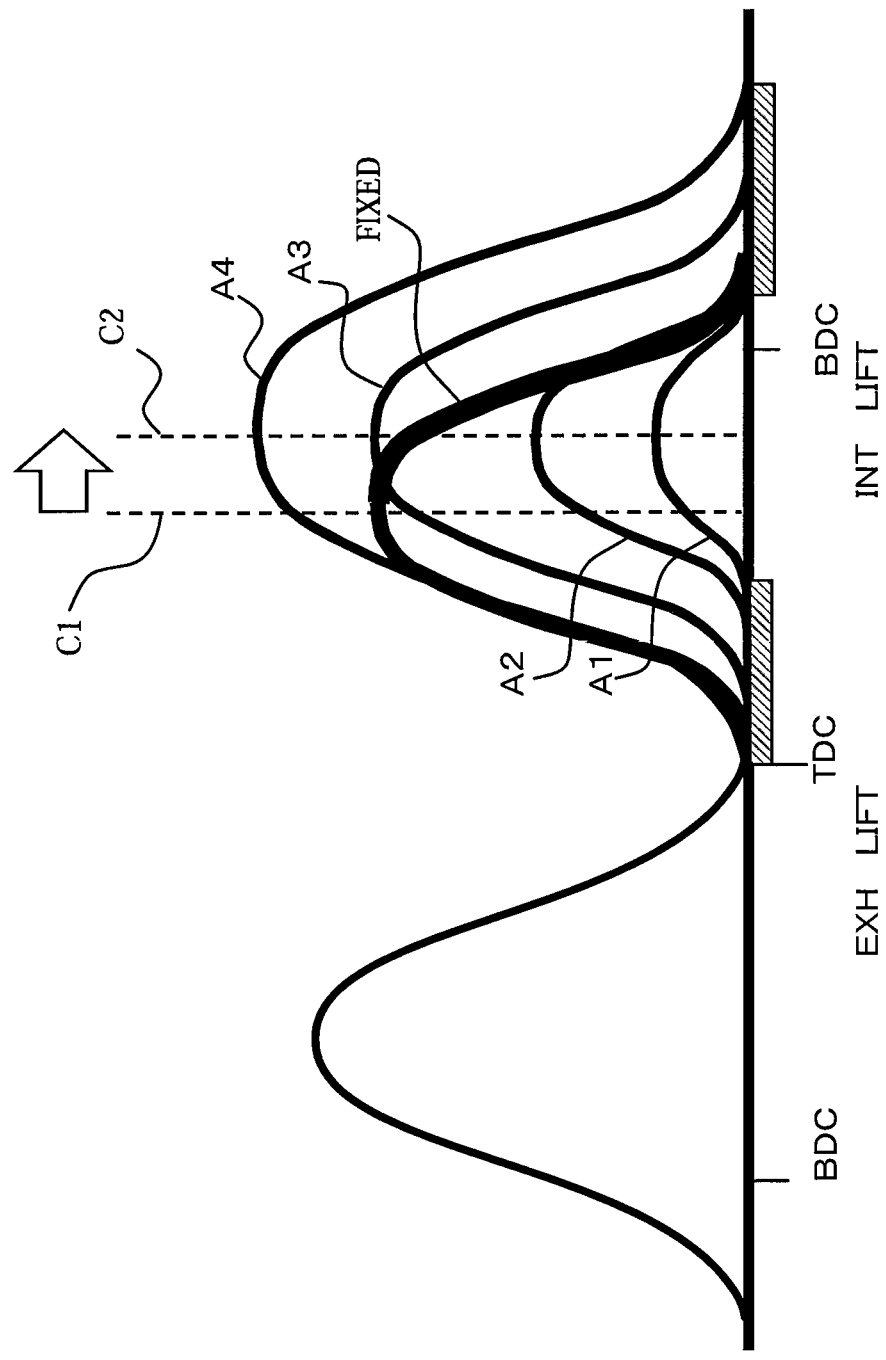
FIG. 2 is a graph showing lift characteristics according to a first embodiment of this invention.

FIG. 2 is a graph showing the lift characteristics according to this embodiment. In FIG. 2, "A1" to "A4" represent lift characteristics of the intake valve to be driven by the rocker cam 8 (hereinafter referred to as "intake valve on the rocker cam 8 side"), and "FIXED" represents a lift characteristic of the intake valve to be driven by the rotary cam 9 (hereinafter referred to as "intake valve on the rotary cam 9 side").

The event angle of the rotary cam 9 is set so that the valve opening timing of the intake valve is close to a top dead center (TDC).

The event angle of the rocker cam 8 is switchable among the minimum event angle (lift characteristic A1) which is smaller than the event angle of the rotary cam 9, the maximum event angle (lift characteristic A4) which is larger than the event angle of the rotary cam 9, and medium event angles (lift characteristics A2 and A3) having medium degrees therebetween.

Further, the broken lines C1 and C2 of FIG. 2 represent the central angles of the rotary cam 9 and the rocker cam 8, respectively, and the central angle of the rocker cam 8 is set on a retard side relative to the central angle of the rotary cam 9.

As described later, the lift characteristics A1 to A4 are switched thereamong in accordance with the running condition of the internal combustion engine.

In the entire cylinder, an intake valve on the rotary cam 9 side is opened first irrespective of which of the lift characteristics A1 to A4 is set. In other words, the opening timing of the intake valve of the cylinder corresponds to the opening timing of the intake valve on the rotary cam 9 side. On the other hand, the closing timing of the intake valve of the cylinder is determined based on the lift characteristic of the intake valve on the rocker cam 8 side. Thus, when the lift characteristics A1 to A4 are switched thereamong, the opening timing of the intake valve is not changed, but only the closing timing is changed.

In other words, without using a variable valve timing mechanism for changing phases of the crankshaft and the drive shaft 2, only the variable event angle mechanism illustrated in FIG. 1 can be used for changing the opening timing of the intake valve similarly to the variable valve timing mechanism. In the manner described above, the variable valve timing system (VVT) can be reduced in its operating range or eliminated.

It should be noted that, in terms of characteristics of the variable event angle mechanism 1, when the event angle of the rocker cam 8 is decreased, the lift amount is decreased as well, and when the event angle is increased, the lift amount is increased as well.

Now, the above-mentioned lift characteristics are described.

In the lift characteristic A1, the intake valve on the rotary cam 9 side is opened first, and then the intake valve on the rocker cam 8 side is opened. After the intake valve on the rocker cam 8 side is closed, the intake valve on the rotary cam 9 side is closed. In such a lift characteristic A1, there is obtained a single valve period in which only the intake valve on the rotary cam 9 side is opened during a time period from the opening of the intake valve on the rotary cam 9 side to the opening of the intake valve on the rocker cam 8 side (this single valve period is hereinafter referred to as "opening-side single valve period"). It should be noted that the hatched portions of FIG. 2 correspond to the single valve period.

Figure 3:
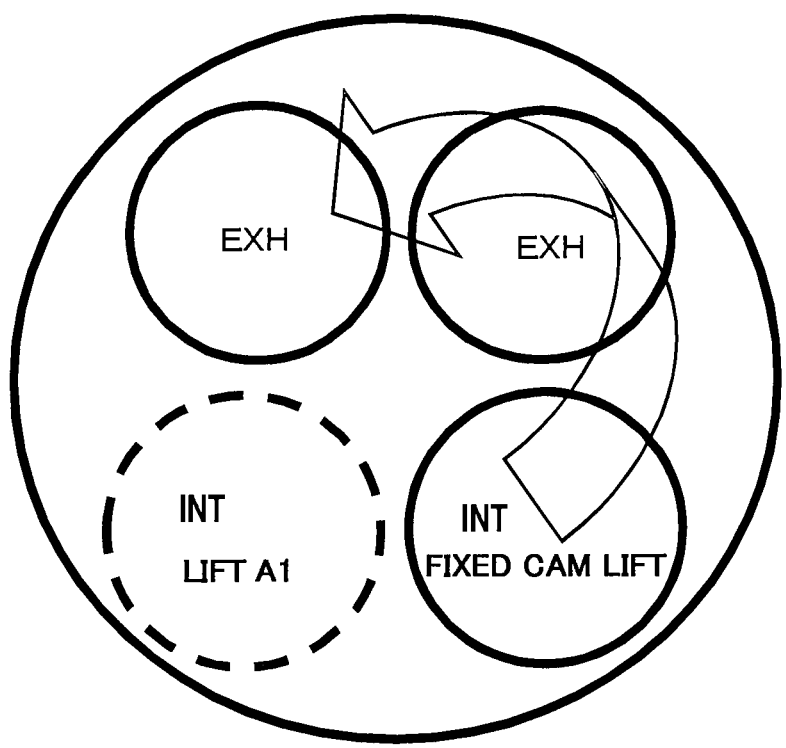
FIG. 3 is a schematic sectional view of an inside of a cylinder as seen from above the cylinder.

FIG. 3 is a schematic sectional view of an inside of the cylinder as seen from above the cylinder, and illustrates a gas flow inside the cylinder during the opening-side single valve period. The broken line of FIG. 3 indicates the intake valve on the rocker cam 8 side in the opened state. During the opening-side single valve period, the intake air flows in mainly through the intake valve on the rotary cam 9 side, and hence no intake air flows collide with each other inside the cylinder. Therefore, as indicated by the arrow of FIG. 3, a swirling flow is generated along a wall surface inside the cylinder so that the gas flow inside the cylinder is enhanced.

Further, after the intake valve on the rocker cam 8 side is opened, the intake valve on the rotary cam 9 side is larger in lift amount than the intake valve on the rocker cam 8 side. The difference in valve lift amount causes a bias in amount of intake air flowing into the cylinder so that the swirling flow generated during the opening-side single valve period is enhanced, and accordingly the gas flow inside the cylinder is enhanced.

As a result, homogeneity of fuel spray is improved, and combustion stability is improved. Accordingly, combustion capacity at the time of introducing EGR is improved as well, and fuel efficiency is improved. The combustion stability is improved, and hence an ignition timing at the engine start can be set on the retard side relative to an ignition timing at the start of a general internal combustion engine. In other words, the rise in exhaust gas temperature due to the retardation of the ignition timing is increased so that an exhaust gas catalyst can be activated more quickly. Thus, exhaust constituent is improved as well.

The lift characteristic A2 is basically similar to the lift characteristic A1. However, the lift characteristic A2 has a shorter opening-side single valve period than the lift characteristic A1, and has a larger valve lift amount than the lift characteristic A1. In other words, the effect of enhancing the gas flow inside the cylinder by providing the opening-side single valve period becomes smaller than that of the lift characteristic A1, but the effect of enhancing the gas flow inside the cylinder due to the difference in valve lift amount becomes greater, and hence the combustion stability is improved similarly. Further, opening dimensions are increased as compared to the lift characteristic A1, and hence a larger intake amount can be ensured.

It should be noted that the "opening dimension" herein refers to a value correlating to the amount of intake air flowing into the cylinder through the intake valve, and corresponds to a value obtained by integrating, based on the duration, the area of a skirt at the time when the valve is opened, that is, the area enclosed with the horizontal axis and the lift characteristic line of FIG. 2.

The lift characteristic A3 has a still shorter opening-side single valve period than the lift characteristic A2, and has a still larger valve lift amount than the lift characteristic of the rotary cam 9. Further, the intake valve on the rocker cam 8 side is closed after the intake valve on the rotary cam 9 side is closed. In other words, there is obtained a single valve period in which only the intake valve on the rocker cam 8 side is opened after the intake valve on the rotary cam 9 side is closed (this single valve period is hereinafter referred to as "closing-side single valve period").

During the closing-side single valve period, there is generated a swirling flow opposite in direction to the swirling flow generated during the opening-side single valve period, and accordingly the gas flow inside the cylinder is enhanced. In other words, in the lift characteristic A3, the gas flow inside the cylinder is enhanced at the latter stage of the intake stroke. Accordingly, in the case of performing external EGR or the like, agitation of an EGR gas can be promoted.

Further, in the entire cylinder, the opening timing of the intake valve corresponds to the opening timing on the rotary cam 9 side, and the closing timing of the intake valve corresponds to the closing timing on the rocker cam 8 side. Accordingly, the opening dimensions are further increased. Further, the closing timing of the intake valve on the rocker cam 8 side is set as a timing at which an intake inertia effect becomes greater. Accordingly, charging efficiency is improved so that the intake amount under a high load can be increased. Therefore, in the lift characteristic A3, the valve closing timing of the intake valve on the rocker cam 8 side is set as a timing at which the intake inertia effect becomes as great as possible.

It should be noted that, in a case of a general internal combustion engine in which two intake valves are closed at the same time, the intake inertia effect at the maximum power point becomes greatest at about 70° after the bottom dead center. In contrast, in this embodiment, assuming that the valve closing timing on the rotary cam 9 side is, for example, about 40° after the bottom dead center, the intake inertia effect becomes greatest when the intake valve on the rocker cam 8 side is closed at about 90° after the bottom dead center.

In the lift characteristic A4, the intake valve on the rocker cam 8 side is opened substantially at the same time as the intake valve on the rotary cam 9 side, and is closed after a lapse of the closing-side single valve period. As compared to the lift characteristic A3, the closing-side single valve period is longer and the lift amount is larger.

Similarly to the lift characteristic A3, the gas flow inside the cylinder is enhanced during the closing-side single valve period, and the opening dimensions are further increased than in the lift characteristic A3. Thus, an intake amount necessary at the time of high-load operation is ensured easily, and further, the gas flow inside the cylinder is enhanced more easily during the closing-side single valve period.

As described above, the lift characteristic A4 is suitable at the time of high-load operation, and may realize reduction in pumping loss by setting the valve closing timing close to, for example, 90° after the bottom dead center so as to attain a so-called late-closing Miller cycle.

In other words, the closing-side single valve period is continued even after the intake inertia effect is not obtained. Accordingly, it is possible to suppress the rise in pressure inside the cylinder along with the rise of the piston, and to therefore reduce the pumping loss. The lift characteristic which enables reduction in pumping loss is also suitable for a medium-load range of, for example, an internal combustion engine for a hybrid vehicle and an internal combustion engine with a supercharger.

Therefore, in the lift characteristic A4, the valve closing timing of the intake valve on the rocker cam 8 side is set so as to attain the above-mentioned late-closing Miller cycle.

It should be noted that the lift characteristic may be set not only by switching stepwise among the lift characteristic A1, the lift characteristic A2, the lift characteristic A3, and the lift characteristic A4, but also by setting a medium-lift characteristic thereamong.

By the way, JP 2008-95668 A discloses a prior art employing a configuration in which, in the dual-intake valve internal combustion engine, the lift characteristic of one intake valve is set variable and the lift characteristic of the other intake valve is fixed. Specifically, in both the variable and fixed lift characteristics, the opening timing is set to the top dead center and the closing timing is set to the bottom dead center. Further, in the variable and fixed lift characteristics, the maximum lift amount and valve acceleration along therewith are different therebetween.

In a general internal combustion engine, the valve closing timing of the intake valve is set after the bottom dead center so as to utilize the intake inertia effect, but in the configuration of the prior art, in the entire cylinder, the intake valve is supposed to be closed at the bottom dead center. Thus, in the configuration of the prior art, the opening dimensions become smaller as the duration of the intake valve becomes shorter, and the maximum power is restricted due to the reduction in charging efficiency. In this respect, in the prior art, there is also disclosed that the cam profile is set so that a sufficient lift amount can be ensured even though the intake valve is closed at the bottom dead center. However, in order to ensure a sufficient lift amount within a short duration, the valve speed and acceleration are increased inevitably, and hence there arise a problem of a jump and bounce of the closed valve, and a problem with the strength of the valve driving mechanism. Thus, it is not realistic or possible in terms of cam design to obtain such a cam profile that a sufficient lift amount can be ensured within a short period in which the intake valve is opened at the top dead center and closed at the bottom dead center. On the other hand, it may be conceived that the closing timing of the intake valve having the fixed lift characteristic is set on the retard side relative to the bottom dead center so as to increase the opening dimensions and therefore ensure the maximum power. However, in this case, there arises a problem in that the gas flow inside the cylinder at the time of low-load operation is weakened due to the increase in opening dimensions.

In contrast, according to this embodiment, the closing timings of the intake valves on the rotary cam 9 side and on the rocker cam 8 side are set on the retard side relative to the bottom dead center, and hence the maximum power is not restricted due to the insufficient opening dimensions. Further, when the duration of the intake valve is short, the lift amount is small as well, and hence there is no problem in terms of cam design. Moreover, in accordance with the lift characteristics A1 and A2, the gas flow inside the cylinder is enhanced during the opening-side single valve period.

Next, control for switching among the lift characteristics A1 to A4 is described.

Figure 4:
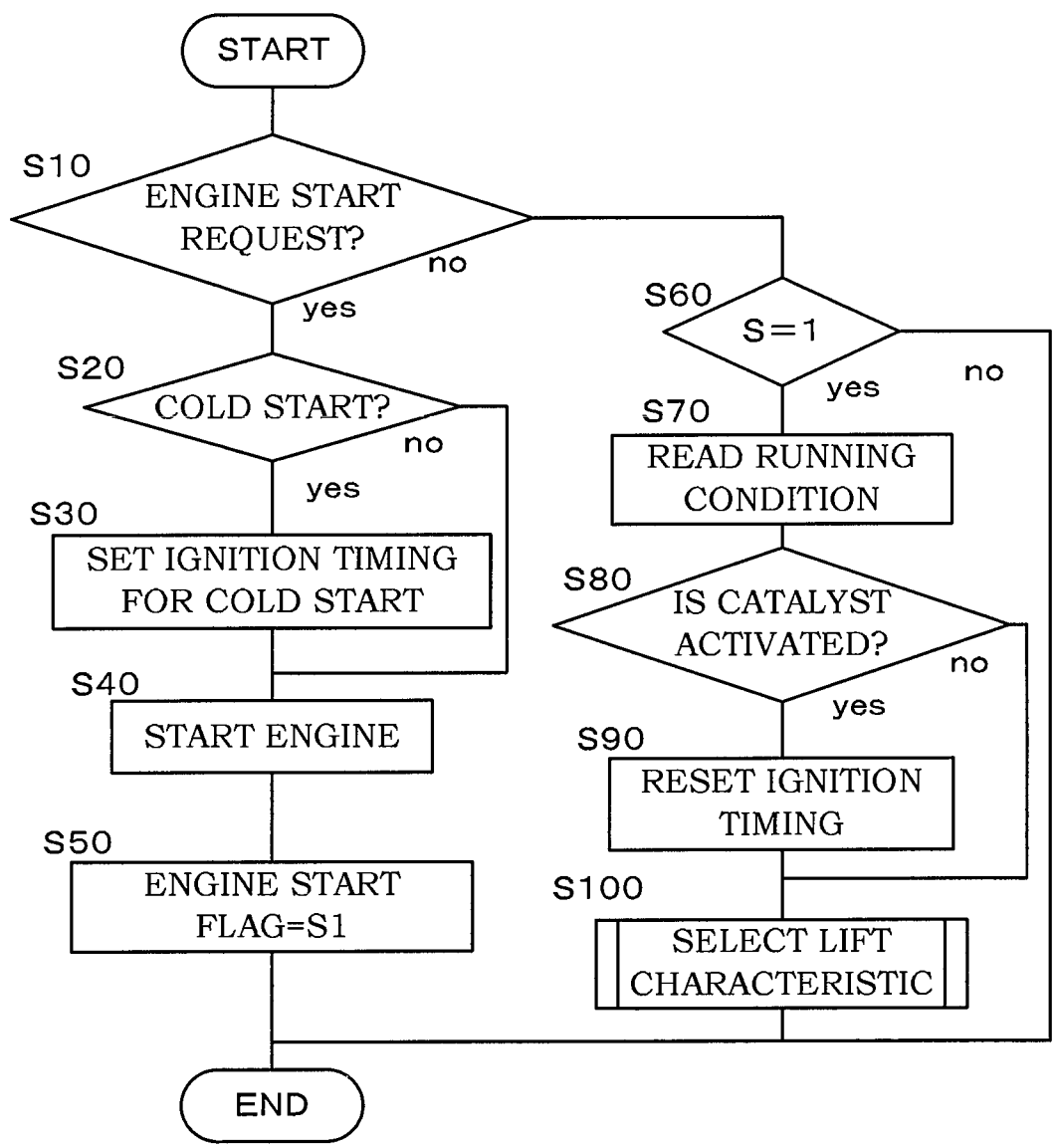
FIG. 4 is a flow chart of a control routine executed by an ECU for switching among the lift characteristics.

FIG. 4 is a flow chart of a control routine executed by the ECU 16 for switching among the lift characteristics. This control routine is executed so as to set lift characteristics suitable for the situations at the start of the internal combustion engine and in the operation after the engine start. It should be noted that this control routine is executed repeatedly in a predetermined cycle, for example, every 10 milliseconds (msec), from the time when the ECU 16 detects a start request for the internal combustion engine to the time when the engine is stopped. In the following, this control routine is described following the respective steps.

In Step S10, the ECU 16 determines whether or not the engine start request is input. For example, the ECU 16 performs the determination based on an engine start request signal from an ignition switch or the like.

In Step S20, the ECU 16 determines whether or not the start of the internal combustion engine is a cold start based on a detection value from a water temperature sensor 19. In a case of the cold start, the ECU 16 executes processing in Step S30, and otherwise executes processing in Step S40.

In Step S30, the ECU 16 sets an ignition timing for the cold start. Specifically, the ECU 16 retards the ignition timing from a default ignition timing that is set for the engine start other than the cold start. This processing is executed so as to promote warming up of the internal combustion engine and quickly activate the exhaust gas catalyst by utilizing such a characteristic that the exhaust gas temperature rises as the ignition timing is retarded. It should be noted that misfire is more liable to occur as the ignition timing is retarded, and hence the retardation amount of the ignition timing is generally restricted under a condition that is unfavorable for obtaining the combustion stability, such as the cold start. However, the lift characteristic A1 is selected at the engine start as described later. Accordingly, the combustion stability is ensured, and the ignition timing can be set to be further retarded than the ignition timing at the start of a general internal combustion engine. Specific retardation amounts are determined through experiments or the like for the respective specifications of the internal combustion engine.

In Step S40, the ECU 16 executes an engine start operation. Specifically, under a state of the lift characteristic A1 that is set in advance as the lift characteristic at the engine start, the ECU 16 drives a starter to execute fuel spray and spark ignition.

In Step S50, the ECU 16 sets an engine start flag S, that is, sets S=1, and ends the processing. It should be noted that the engine start flag S is reset to zero when stopping the internal combustion engine or starting the next engine start control.

In the second and subsequent processing after the engine start request is input, the ECU 16 executes processing in Step S60 after Step S10.

In Step S60, the ECU 16 determines whether or not the engine start flag S is "1". When S=1, the ECU 16 executes processing in Step S70, and otherwise, that is, when S=0, the ECU 16 ends the processing.

In Step S70, the ECU 16 reads the running condition. Specifically, the ECU 16 reads an engine speed determined based on the detection signal from the crank angle sensor 17, a load determined based on the detection value from the accelerator opening degree sensor 18, and a cooling water temperature determined based on the detection signal from the water temperature sensor 19.

In Step S80, the ECU 16 determines whether or not the exhaust gas catalyst is activated. When the exhaust gas catalyst is activated, the ECU 16 executes processing in Step S90, and when the exhaust gas catalyst is not activated, the ECU 16 executes processing in Step S100.

Whether or not the exhaust gas catalyst is activated can be determined based on whether or not the temperature of the exhaust gas catalyst reaches an activation temperature. Therefore, when a temperature sensor is provided for detection of the temperature of the exhaust gas catalyst, the determination can be performed based on a detection value from the temperature sensor. Alternatively, a time period required in a range from the engine start to the activation may be determined through experiments or the like, and stored as a determination threshold value. When the time period from the engine start exceeds the determination threshold value, the ECU 16 may determine that the exhaust gas catalyst is activated.

It should be noted that the ECU 16 may determine whether or not the state of the engine is shifted from a cold state to a warm state. In this case, the ECU 16 determines the state of the internal combustion engine based on the cooling water temperature. When the state of the engine is shifted to the warm state, the ECU 16 executes the processing in Step S90, and when the state of the engine remains the cold state, the ECU 16 executes the processing in Step S100.

In Step S90, the ECU 16 changes the ignition timing from the ignition timing for the cold operation to an ignition timing for operation after the end of warming up. Similarly to the case of a general internal combustion engine, the ignition timing for operation after the end of warming up is set based on an ignition timing map associated with the running condition.

In Step S100, the ECU 16 selects a lift characteristic associated with the running condition. Specifically, the ECU 16 selects the lift characteristic by searching a lift characteristic map illustrated in FIG. 5 through use of the load and the engine speed that are read as the running condition. In the lift characteristic map of FIG. 5, the vertical axis represents a load and the horizontal axis represents an engine speed. The solid line WOT of FIG. 5 indicates a full load curve connecting full loads at the respective values of the engine speed. The circles "a" to "e" of FIG. 5 indicate operation ranges. It should be noted that the areas "a" to "e" are enclosed with circles, and those circles indicate representative ranges of the respective areas, but do not indicate strict ranges of the respective areas. Thus, for example, the ranges of the respective areas of FIG. 5 may be enlarged and the entire operation range of FIG. 5 may be divided into five areas "a" to "e".

The lift characteristics in the respective operation ranges are described.

The area "a" indicates a low-rpm, high-load range, in which the ECU 16 selects the lift characteristic A1.

In accordance with the lift characteristic A1, there are obtained, for example, effects of improving the combustion stability and agitation performance for the EGR gas and fuel spray, by enhancing the gas flow inside the cylinder. Thus, stable combustion can be realized in a range in which the intake air flow rate is low and the intake amount is large as in the area "a". Accordingly, the fuel efficiency and the exhaust constituent can be improved.

The area "b" indicates a medium-rpm, high-load range, in which the ECU 16 selects the lift characteristic A2. Accordingly, similar effects to those in the case of the area "a" are obtained and the opening dimensions are increased as compared to the lift characteristic A1. Thus, an intake amount corresponding to a higher load can be ensured.

The area "c" indicates a high-rpm, high-load range, in which the ECU 16 selects the lift characteristic A3. In the lift characteristic A3, through the improvement in charging efficiency-due to the effect of increasing the opening dimensions and the optimization of the closing timing of the intake valve, the intake amount in the high-rpm, high-load range can be increased. Further, the gas flow inside the cylinder is enhanced by providing the closing-side single valve period, which produces effects of improving the homogeneity of fuel spray and, in the case of performing external EGR or the like, promoting the agitation of the EGR gas.

The area "d" indicates a low/medium-rpm, low/medium-load range, that is, a so-called partial range, in which the ECU 16 selects the lift characteristic A4. As described above, the lift characteristic A4 corresponds to the so-called late-closing Miller cycle, which produces effects of reducing pumping loss and enhancing the gas flow inside the cylinder by providing the closing-side single valve period. As a result, the fuel efficiency can be improved.

The area "e" indicates an ultra-low-load range including a state at the engine start and an idle state. In the case of the state at the engine start, the lift characteristic is not selected in Step S100 of FIG. 4, but the lift characteristic A1 is set in advance as the lift characteristic at the engine start. It should be noted that, when decompression is necessary at the engine start, the lift characteristic A4 is set so that the engine start performance can be improved.

It should be noted that, in intermediate areas among the areas "a" to "d", the ECU 16 selects a medium-lift characteristic among the respective lift characteristics. For example, when the values of the engine speed and load change from the area "a" toward the area "b", the lift characteristic to be selected by the ECU 16 changes in a continuous or stepwise manner so as to switch from the lift characteristic A1 toward the lift characteristic A2 in accordance with the change in engine speed and load.

As described above, the following effects are obtained in this embodiment.

The ECU 16 sets the lift characteristic of the rocker cam 8 so as to obtain a valve opening timing on the retard side relative to that of the rotary cam 9 in the case of the lift characteristic A1 as a low-lift characteristic, to obtain a valve opening timing that is advanced as the lift characteristic changes toward the lift characteristic A4 as a high-lift characteristic, and to obtain a valve closing timing on the retard side relative to that of the rotary cam 9 in the case of the high-lift characteristic. Accordingly, in the low-lift characteristic, the gas flow inside the cylinder can be enhanced at the initial stage of the intake stroke, and hence the combustion capacity is improved so that the combustion stability and EGR capacity are improved. Thus, the fuel efficiency can be improved. Further, in the high-lift characteristic, the opening dimensions are increased, and hence the intake amount can be ensured.

The valve closing timing of the intake valve of the rotary cam 9 is set on the retard side relative to the bottom dead center, and hence the opening dimensions can be ensured.

At the engine start and in the ultra-low-load range as well as in the low-rpm, high-load range, the ECU 16 selects the lift characteristic A1 having the event angle and the lift amount each being smaller than those of the rotary cam 9 and having the valve opening timing set on the retard side relative to that of the rotary cam 9. Accordingly, the gas flow inside the cylinder can be enhanced at the initial stage of the intake stroke, and the fuel efficiency can be improved.

In the low/medium-rpm, low/medium-load range, the ECU 16 selects the lift characteristic A4 having the lift amount and the event angle each being larger than those of the rotary cam 9 and having the valve closing timing set to avoid obtaining the intake inertia effect after the bottom dead center. Accordingly, pumping loss can be reduced.

In the high-rpm, high-load range, the ECU 16 selects the lift characteristic A3 having the event angle and the lift amount each being larger than those of the rotary cam 9 and having the valve closing timing set on the retard side relative to that of the rotary cam 9 and further set to obtain the intake inertia effect. Accordingly, an intake amount necessary for the high-load operation is ensured, and the gas flow inside the cylinder is enhanced by providing the closing-side single valve period so that the combustion capacity and the like can be improved.

Second Embodiment

A second embodiment of this invention is described. A configuration of an internal combustion engine to which this embodiment is applied and a control routine executed by the ECU 16 for selecting a lift characteristic are basically similar to those in the first embodiment.

Figure 6:
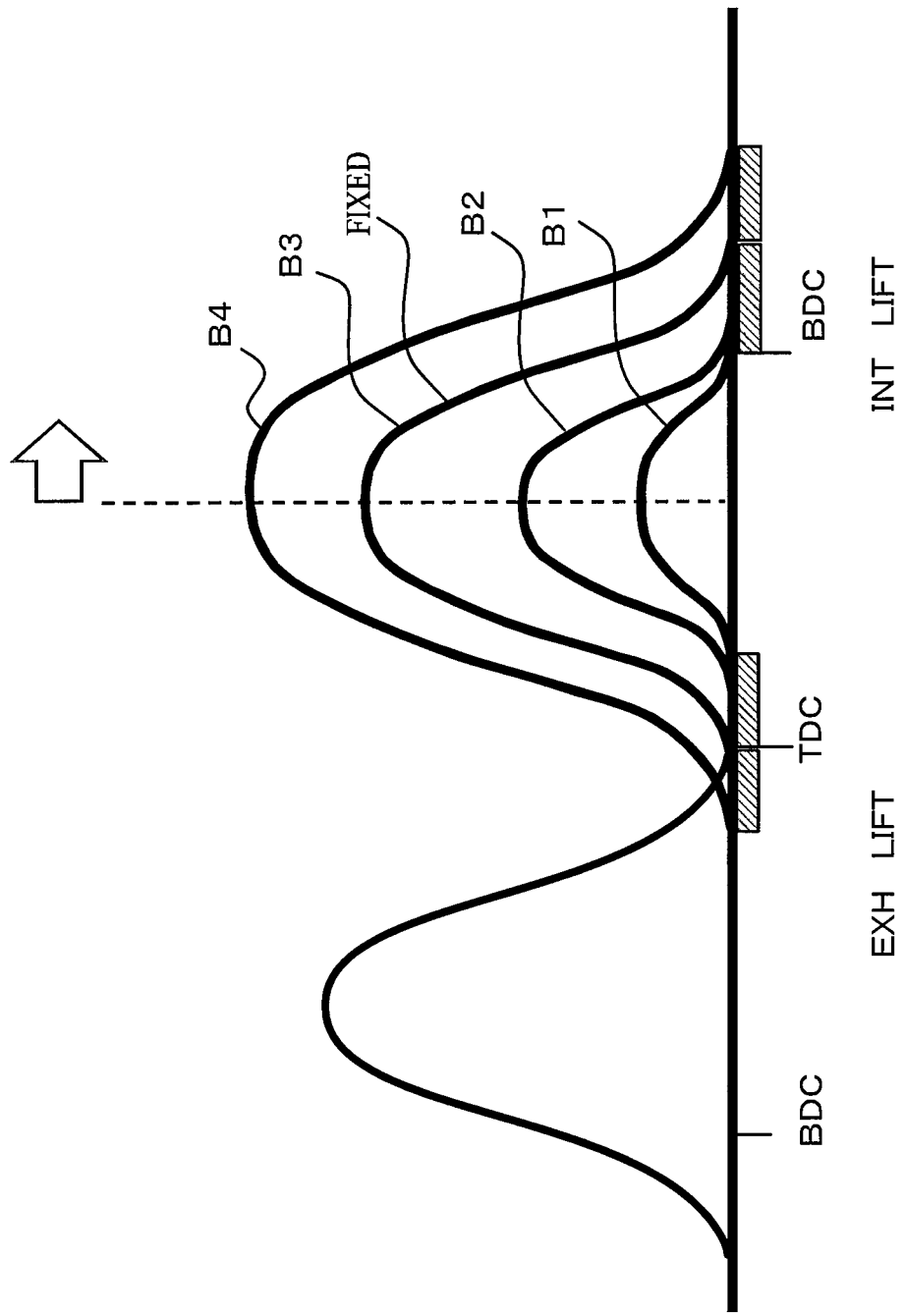
FIG. 6 is a graph showing lift characteristics according to a second embodiment of this invention.

FIG. 6 is a graph showing lift characteristics to be used in this embodiment in a manner similar to that of FIG. 2.

Figure 5:
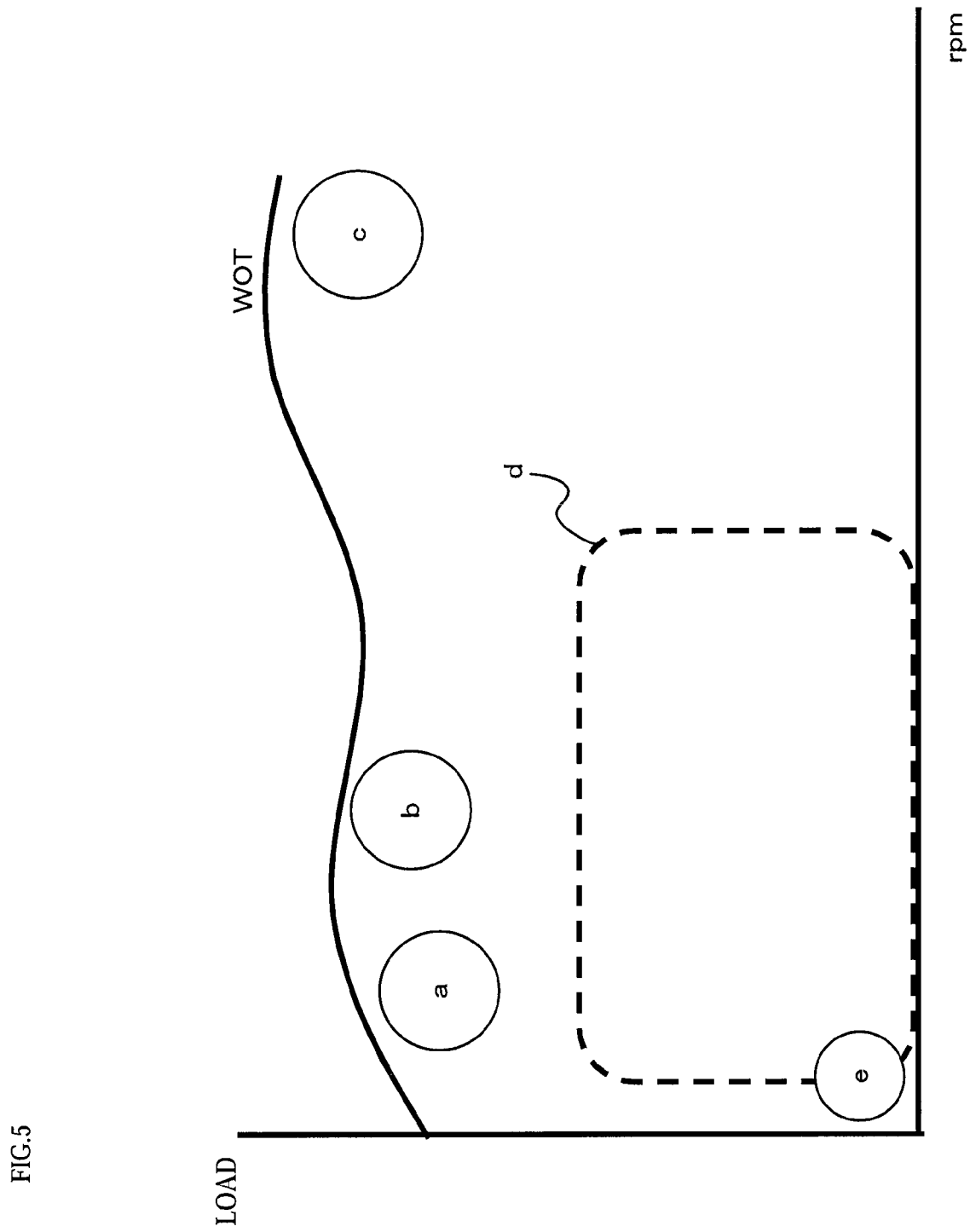
FIG. 5 is a lift characteristic map stored in the ECU.

Lift characteristics B1 to B4 of FIG. 6 provide similar event angles and lift amounts to those of the lift characteristics A1 to A4 of FIG. 2, respectively, and the ECU 16 selects the lift characteristics B1 to B4 in the areas "a" to "d" of FIG. 5, respectively. At the engine start, the lift characteristic is set to the lift characteristic B1.

It should be noted that the lift characteristics B1 to B4 are different from the lift characteristics A1 to A4 in that the central angles of the rotary cam 9 and the rocker cam 8 are equal to each other. Accordingly, the following differences are produced between the lift characteristics B1 to B4 and the lift characteristics A1 to A4.

The lift characteristic B1 has a shorter opening-side single valve period than the lift characteristic A1, but has a closing-side single valve period. In other words, the single valve period is divided into two opening-side and closing-side single valve periods.

Also in the lift characteristic B2, similarly to the lift characteristic B1, the single valve period is divided into two opening-side and closing-side single valve periods, and the effect of enhancing the gas flow inside the cylinder becomes smaller than that of the lift characteristic A2.

The lift characteristic B3 matches with the lift characteristic of the rotary cam 9. In other words, the lift characteristic B3 does not have the closing-side single valve period unlike the lift characteristic A3.

In the lift characteristic B4, the intake valve is opened on the advance side relative to the TDC, and the opening-side single valve period extends until the intake valve on the rotary cam 9 side is opened. On the other hand, the closing-side single valve period is shorter than that of the lift characteristic A4. In other words, also in the lift characteristic B4, the single valve period is divided into two opening-side and closing-side single valve periods.

When the single valve period is divided into two opening-side and closing-side single valve periods as in the lift characteristics B1, B2, and B4, the effect of enhancing the gas flow inside the cylinder becomes smaller than in the case where only one of the opening-side and closing-side single valve periods is provided as in the lift characteristics A1, A2, and A4.

However, in the lift characteristic B4, the valve opening timing of the intake valve can be set before the top dead center. When the intake valve is opened before the top dead center, that is, in the middle of the rise of the piston, a part of the exhaust gas is discharged to the intake port, and the temperatures of the intake valve and the wall of the intake port rise due to heat of the exhaust gas. Therefore, when the lift characteristic B4 is employed in a so-called port injection internal combustion engine which injects fuel into the intake port, atomization of the fuel is promoted so that the combustion stability, the exhaust constituent, and the like can be improved. On the other hand, when the lift characteristic B4 switches to the lift characteristic B3 or the like, the exhaust gas can be prevented from being discharged to the intake port, which can support such a running condition that the discharge of the exhaust gas to the intake port is unfavorable.

As described above, in this embodiment, in addition to the effects similar to those in the first embodiment, there are obtained, for example, effects of promoting the atomization of the fuel and improving the combustion stability by blowing a part of the exhaust gas back to the intake port.

Though a description has been given of the embodiments of this invention, the embodiments describe only a part of application examples of this invention, and are not intended to limit the technical scope of this invention to the specific configurations of the above-mentioned embodiments.

This application claims priority from Japanese Patent Application No. 2011-17807, filed on Jan. 31, 2011 in the Japan Patent Office, the entire disclosure of which is incorporated herein by reference.

The invention claimed is:

1. An internal combustion engine including two intake valves for each cylinder comprising:
  a fixed cam for driving one of the two intake valves with a lift characteristic having a valve opening timing close to a top dead center;
  a variable valve actuation mechanism capable of changing, in accordance with an engine running condition, lift characteristics between a low-lift characteristic having an event angle and a lift amount each being smaller than an event angle and a lift amount of the fixed cam, and a high-lift characteristic having the event angle and the lift amount each being larger than the event angle and the lift amount of the fixed cam; and
  a variable cam for driving another of the two intake valves, the variable cam including the variable valve actuation mechanism,
  wherein the variable valve actuation mechanism is configured to set the lift characteristic of the variable cam so as to obtain a valve opening timing on a retard side relative to the valve opening timing of the fixed cam in a case of the low-lift characteristic.

2. The internal combustion engine according to claim 1, wherein the valve closing timing of the intake valve which driven by the fixed cam is set on the retard side relative to a bottom dead center.

3. The internal combustion engine according to claim 1, wherein the variable valve actuation mechanism is configured to set the lift characteristic of the variable cam so that, at an engine start and in an ultra-low-load range as well as in a low-rpm, high-load range, the event angle and the lift amount are smaller than the event angle and the lift amount of the fixed cam, and the valve opening timing is set on the retard side relative to the valve opening timing of the fixed cam.

4. The internal combustion engine according to claim 1, wherein the variable valve actuation mechanism is configured to set the lift characteristic of the variable cam so that, in a low/medium-rpm, low/medium-load range, the event angle and the lift amount are larger than the event angle and the lift amount of the fixed cam, and the valve closing timing is set to avoid obtaining an intake inertia effect after the bottom dead center.

5. The internal combustion engine according to claim 1, wherein the variable valve actuation mechanism is configured to set the lift characteristic of the variable cam so that, in a high-rpm, high-load range, the event angle and the lift amount are larger than the event angle and the lift amount of the fixed cam, and the valve closing timing is set on the retard side relative to the valve closing timing of the fixed cam and is further set to obtain the intake inertia effect.

6. An internal combustion engine including two intake valves for each cylinder comprising:
  a fixed cam for driving one of the two intake valves with a lift characteristic having a valve opening timing close to a top dead center;
  a variable valve actuation mechanism capable of changing, in accordance with an engine running condition, lift characteristics between a low-lift characteristic having an event angle and a lift amount each being smaller than an event angle and a lift amount of the fixed cam, and a high-lift characteristic having the event angle and the lift amount each being larger than the event angle and the lift amount of the fixed cam; and
  a variable cam for driving another of the two intake valves, the variable cam including the variable valve actuation mechanism,
  wherein the variable valve actuation mechanism is configured to set the lift characteristic of the variable cam so as to obtain a valve opening timing that is advanced as the lift characteristic changes toward the high-lift characteristic, and to obtain a valve closing timing on a retard side relative to a valve closing timing of the fixed cam in a case of the high-lift characteristic.

7. The internal combustion engine according to claim 6, wherein the valve closing timing of the intake valve which driven by the fixed cam is set on the retard side relative to a bottom dead center.

8. The internal combustion engine according to claim 6, wherein the variable valve actuation mechanism is configured to set the lift characteristic of the variable cam so that, at an engine start and in an ultra-low-load range as well as in a low-rpm, high-load range, the event angle and the lift amount are smaller than the event angle and the lift amount of the fixed cam, and the valve opening timing is set on the retard side relative to the valve opening timing of the fixed cam.

9. The internal combustion engine according to claim 6, wherein the variable valve actuation mechanism is configured to set the lift characteristic of the variable cam so that, in a low/medium-rpm, low/medium-load range, the event angle and the lift amount are larger than the event angle and the lift amount of the fixed cam, and the valve closing timing is set to avoid obtaining an intake inertia effect after the bottom dead center.

10. The internal combustion engine according to claim 6, wherein the variable valve actuation mechanism is configured to set the lift characteristic of the variable cam so that, in a high-rpm, high-load range, the event angle and the lift amount are larger than the event angle and the lift amount of the fixed cam, and the valve closing timing is set on the retard side relative to the valve closing timing of the fixed cam and is further set to obtain the intake inertia effect.

11. An internal combustion engine including two intake valves for each cylinder comprising:
a fixed cam for driving one of the two intake valves with a lift characteristic having a valve opening timing close to a top dead center;
a variable valve actuation mechanism capable of changing, in accordance with an engine running condition, lift characteristics between a low-lift characteristic having an event angle and a lift amount each being smaller than an event angle and a lift amount of the fixed cam, and a high-lift characteristic having the event angle and the lift amount each being larger than the event angle and the lift amount of the fixed cam; and
a variable cam for driving another of the two intake valves, the variable cam including the variable valve actuation mechanism,
wherein the variable valve actuation mechanism is configured to set the lift characteristic of the variable cam so as to obtain a valve opening timing on a retard side relative to the valve opening timing of the fixed cam in a case of the low-lift characteristic, to obtain a valve opening timing that is advanced as the lift characteristic changes toward the high-lift characteristic, and to obtain a valve closing timing on the retard side relative to a valve closing timing of the fixed cam in a case of the high-lift characteristic.

12. The internal combustion engine according to claim 11, wherein the valve closing timing of the intake valve which driven by the fixed cam is set on the retard side relative to a bottom dead center.

13. The internal combustion engine according to claim 11, wherein the variable valve actuation mechanism is configured to set the lift characteristic of the variable cam so that, at an engine start and in an ultra-low-load range as well as in a low-rpm, high-load range, the event angle and the lift amount are smaller than the event angle and the lift amount of the fixed cam, and the valve opening timing is set on the retard side relative to the valve opening timing of the fixed cam.

14. The internal combustion engine according to claim 11, wherein the variable valve actuation mechanism is configured to set the lift characteristic of the variable cam so that, in a low/medium-rpm, low/medium-load range, the event angle and the lift amount are larger than the event angle and the lift amount of the fixed cam, and the valve closing timing is set to avoid obtaining an intake inertia effect after the bottom dead center.

15. The internal combustion engine according to claim 11, wherein the variable valve actuation mechanism is configured to set the lift characteristic of the variable cam so that, in a high-rpm, high-load range, the event angle and the lift amount are larger than the event angle and the lift amount of the fixed cam, and the valve closing timing is set on the retard side relative to the valve closing timing of the fixed cam and is further set to obtain the intake inertia effect.

* * * * *